United States Patent
Gallagher et al.

(10) Patent No.: US 7,006,252 B2
(45) Date of Patent: Feb. 28, 2006

(54) IMAGE PROCESSING SYSTEM AND METHOD THAT MAINTAINS BLACK LEVEL

(75) Inventors: Andrew C. Gallagher, Brockport, NY (US); Edward B. Gindele, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 718 days.

(21) Appl. No.: 09/981,176

(22) Filed: Oct. 17, 2001

(65) Prior Publication Data

US 2003/0076514 A1   Apr. 24, 2003

(51) Int. Cl.
G06F 15/00 (2006.01)
G06K 9/00 (2006.01)
G03B 27/32 (2006.01)
G03B 27/72 (2006.01)
G03B 27/54 (2006.01)

(52) U.S. Cl. .......... 358/1.9; 382/162; 355/27; 355/35; 355/67

(58) Field of Classification Search .......... 358/1.9, 358/527, 529, 531; 382/162, 167; 348/97
See application file for complete search history.

(56) References Cited

U.S. PATENT DOCUMENTS

| | | | |
|---|---|---|---|
| 4,151,560 A * | 4/1979 | Zinchuk | 348/97 |
| 4,668,082 A | 5/1987 | Terashita et al. | 355/77 |
| 4,945,406 A | 7/1990 | Cok | 358/80 |
| 5,081,485 A | 1/1992 | Terashita | 355/38 |
| 5,134,573 A | 7/1992 | Goodwin | 364/525 |
| 5,363,209 A | 11/1994 | Eschbach et al. | 358/445 |
| 5,608,548 A | 3/1997 | Sobol | 358/522 |
| 5,781,315 A | 7/1998 | Yamaguchi | 358/520 |
| 5,822,453 A | 10/1998 | Lee et al. | 382/169 |
| 5,978,100 A | 11/1999 | Kinjo | 358/453 |
| 6,097,470 A | 8/2000 | Buhr et al. | 355/38 |
| 6,097,471 A | 8/2000 | Buhr et al. | 355/38 |
| 6,204,940 B1 | 3/2001 | Lin et al. | 358/527 |
| 6,246,494 B1 | 6/2001 | Tatsumi | 358/522 |
| 6,462,835 B1 * | 10/2002 | Loushin et al. | 358/1.9 |

* cited by examiner

*Primary Examiner*—Kimberly Williams
*Assistant Examiner*—Charlotte M. Baker
(74) *Attorney, Agent, or Firm*—Thomas H. Close

(57) ABSTRACT

A method for processing a photographic image captured by an image capture system, includes the steps of: determining a maximum dark value for the image capture system representing the response of the system to no light exposure; generating an image processing path for processing the image prior to display on an output device, the image processing path having one or more image dependent image transforms, that upon processing the maximum dark value produces a processed maximum dark value that meets a predetermined criteria for darkness such that the "smokey black" problem is minimized; and applying the image processing path to the photographic image to produce a processed photographic image.

20 Claims, 6 Drawing Sheets

IMAGE PROCESSING SYSTEM AND METHOD THAT MAINTAINS BLACK LEVEL

FIELD OF THE INVENTION

The invention relates generally to the field of digital image processing and, more particularly, to a method and system for ensuring that regions of an input image corresponding to little or no light received by an image capture medium are reproduced as dark regions in an output image.

BACKGROUND OF THE INVENTION

In an imaging system, the areas of the image sensing device receiving no incident light should be reproduced as black in the displayed image, such as a photographic print or an image on a CRT monitor. Photographic prints are often of objectionable quality if areas of the image that should be black are lighter than black. This problem is referred to as the "smoky black" problem because such images have an appearance that areas or objects that should appear dark or black appear too light. For example, consumer photographs of fireworks generally contain large regions with little or no light exposure. Fireworks images are often printed too light, resulting in images with smoky black or gray backgrounds which are not satisfactory.

For photographic negatives, the areas of the film receiving no exposure have a minimum density called $D_{min}$. $D_{min}$ is also sometimes referred to as mask or base density. It is common to use the value of $D_{min}$ in the processing of digital images for the purpose of improving image quality. For example, in U.S. Pat. No. 5,081,485, issued Jan. 14, 1992, Terashita describes a method of using a mask density to improve the exposure estimate for an image. To this end, the mask density is subtracted from the average density. This increases the robustness of the determined color balance by decreasing the variability between different color negative films. However, Terashita's method does not ensure that regions of an image sensing device receiving little or no light exposure are mapped to substantially black in an output image.

In U.S. Pat. No. 5,781,315, issued Jul. 14, 1998, Yamaguchi describes a method of processing photographic film images which involves using the $D_{min}$ value to apply a nonlinear correction to the digitized version of the image. The $D_{min}$ values allow for increased accuracy in correction of contrast in the toe portion of the photograph. Additionally, Yamaguchi describes a method for decreasing the chroma of low chroma pixels, especially of underexposed pixels. Yamaguchi's method does not ensure that regions of a image sensing device receiving little or no light exposure are mapped substantially to black in an output image.

A method of correcting for the non-linearities in the response of photographic film is described in U.S. Pat. No. 5,134,573, issued Jul. 28, 1992 to Goodwin. This method uses the film $D_{min}$ to apply a nonlinear correction by first shifting each channel of the digital color image by an amount such that actual $D_{min}$ values match standard $D_{min}$ values and then applying the nonlinear correction to extend the linear range of the photographic film. Goodwin's method does not ensure that regions of a image sensing device receiving little or no light exposure are mapped substantially to black in an output image.

In addition, automatic exposure determination algorithms, or scene balance algorithms, estimate and apply balance adjustments which are required by both digital and optical imaging systems. These algorithms are used in high speed optical printers or in Photo-CD scanners. For example, U.S. Pat. No. 4,668,082, issued May 26, 1987 to Terashita et al.; U.S. Pat. No. 4,945,406 issued Jul. 31, 1990 to Cok; and U.S. Pat. No. 5,978,100 issued Nov. 2, 1999 to Kinjo, all describe automatic exposure determination algorithms. Generally, these algorithms are based on regressions between aim balances and image features. None of these methods describe a method of ensuring that regions of a image sensing device receiving little or no light exposure are mapped substantially to black in an output image.

Finally, contrast modification methods exits to modify the contrast of images. For example U.S. Pat. No. 6,204,940 issued Mar. 20, 2001 to Lin et al. describes a method image contrast modification employing a step of white/black point mapping. Black point mapping techniques typically involve determining the code value corresponding to a specific (low) percentage point of the cumulative histogram and mapping that code value to a desired code value, usually with a look-up-table (LUT). While such methods can guarantee that the resulting output image will contain black or dark pixels or regions, this technique can damage images of scenes not having any black regions. For example, a photograph of the ocean may be a relatively low contrast image showing the beach and sky with no dark areas. However, applying black point mapping would necessitate that the darkest regions of the image be mapped to black (or very dark) in the output image. This technique often damages image quality by forcing the image to contain black, thereby severely increasing the contrast of the image. Without prior knowledge of the capture system or semantic knowledge of the scene, it is very difficult to determine whether areas of an image actually appeared "black" in the original scene.

Therefore, there exists a need for an improved method and system of image processing that ensures that regions of an input image corresponding to little or no light received by an image capture medium are reproduced as dark regions in an output image without severely increasing image contrast.

SUMMARY OF THE INVENTION

The need is met according to the present invention, by providing a method and system for processing an image that includes: determining a maximum dark value for the image capture system representing the response of the system to no light exposure; generating an image processing path for processing the image prior to display on an output device, the image processing path having one or more image dependent image transforms, that upon processing the maximum dark value produces a processed maximum dark value that meets a predetermined criteria for darkness such that the "smokey black" problem is minimized; and applying the image processing path to the photographic image to produce a processed photographic image.

ADVANTAGES

The present invention has the advantage that regions of an image sensing device receiving little or no light exposure are mapped substantially to black without severely increasing the contrast of the image.

DETAILED DESCRIPTION OF THE INVENTION

Figure 1:
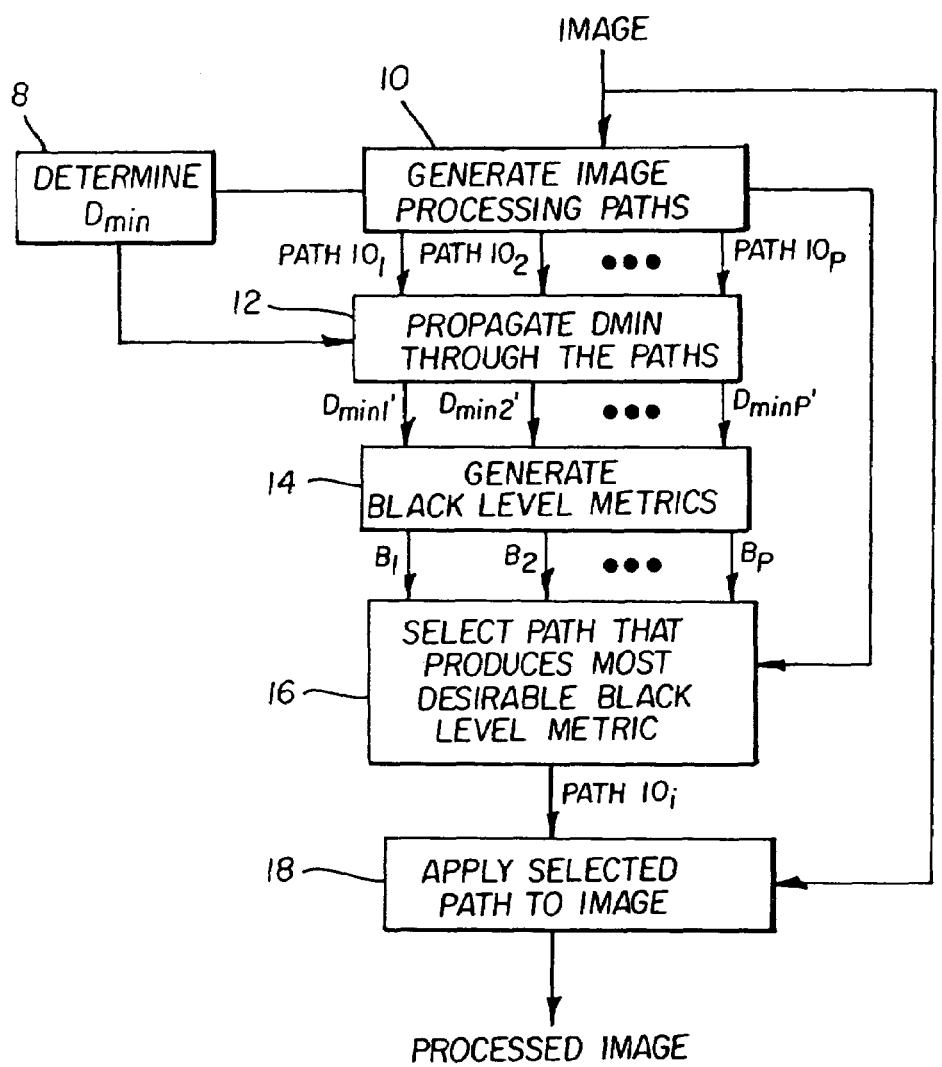
FIG. 1 is flow chart illustrating the method of the present invention.

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown or described herein, may be selected from such materials, components and elements known in the art. Given the description as set forth in the following specification, all software implementation thereof is conventional and within the ordinary skill in such arts.

It is instructive to note that the present invention can be used to select an image processing path for either an analog image in an analog imaging system or a digital image in a digital imaging system. An analog image is an image represented in a physical medium, such as a photographic negative or a photographic positive (slide), or photographic print. A digital image is typically a two-dimensional array of numbers representing red, green and blue pixel values or monochrome pixel values corresponding to light intensities. With regard to matters of nomenclature, the value of a pixel of a digital image located at coordinates (x,y), referring to the $x^{th}$ row and the $y^{th}$ column of a digital image, shall herein comprise a triad of values [r(x,y), g(x,y), b(x,y)] respectively referring to the values of the red, green and blue digital image channels at location (x,y). In this regard, a digital image may be considered as comprising a certain number of digital image channels. In the case of a digital image comprising red, green and blue two-dimensional arrays, the image comprises three channels, namely, red, green and blue spectral channels. In addition, in the case where the image f is an analog image, then the value f(x,y) represents a light intensity at a location indicated by (x,y).

Additionally, the present invention specifically addresses problems encountered when rendering images of photographic film origin. Rendering, or mapping input image densities to output media densities on the output media, occurs in both digital imaging and optical imaging and is well known to those skilled in the art. U.S. Pat. No. 6,097,470 issued Aug. 1, 2000 to Buhr et al. describes image rendering.

Typically, when processing photographic film, the $D_{min}$ is stable for any given film type. For example, 800 speed film from a specific manufacturer has a relatively constant $D_{min}$ over many samples of the film. $D_{min}$ identifies the average density created on an area of photographic film receiving no incident light exposure. Alternatively, the minimum pixel value in a region that received no light could be used to define $D_{min}$.

FIG. 1 illustrates the preferred embodiment of the present invention for processing an image with a specific image processing path to obtain an output image. In general, the present invention allows for the selection of an image processing path which will produce an output image which avoids a smoky black appearance, or at least minimizes a smoky black appearance in the output image. First, a $D_{min}$ value for the image processing system (not necessarily the minimum density in the image itself) is determined 8. Next, several image processing paths $10_1, \ldots, 10_i, \ldots, 10_p$ are generated 10 for use in creating the output image from a particular image. Generally, the first potential image processing path $10_1$ is referred to as the base image processing path. This image processing path was optimized in order to create output images that are generally satisfactory for a range of input images. The remaining image processing paths $10_2, \ldots, 10_p$ are alternative potential image processing paths which are various attempts to produce more satisfying output images than the base image processing path for at least a subset of all possible images. Image processing paths and their composition will be further described below.

Figure 2:
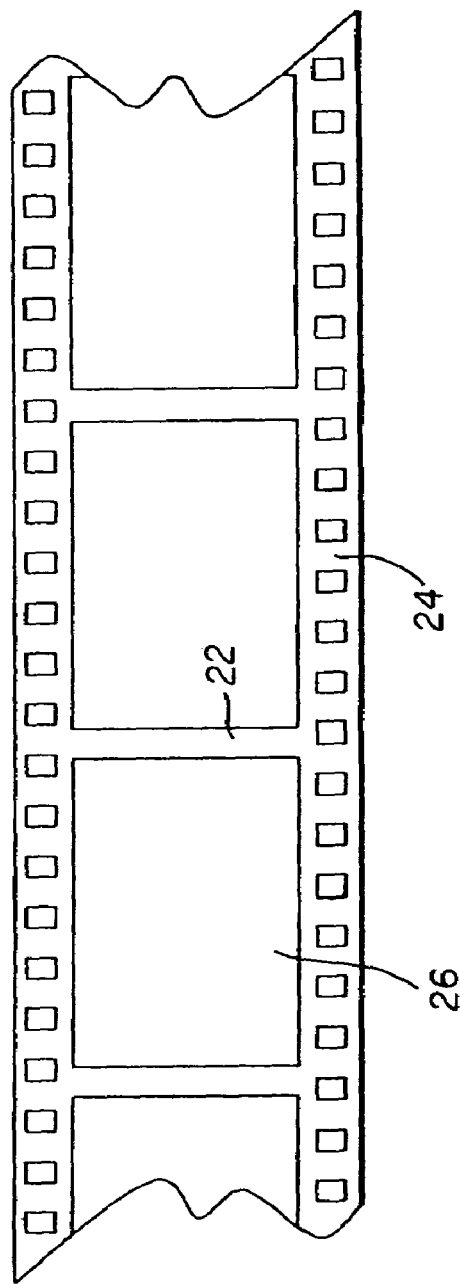
FIG. 2 shows a portion of a photographic film strip, indicating the image frame region, the inter-frame gap, and inter-perforation gap which are regions from which $D_{min}$ may be determined.

$D_{min}$ describes the expected density of the photographic film in areas receiving no light exposure. In the preferred embodiment, the $D_{min}$ is determined by sensing an identification code on the photographic film. The identification code is then employed to address a database that contains the Dmin value. The database may be created ahead of time, using manufacture's specifications for the specific photographic film. In an alternative embodiment, as shown in FIG. 2, a scanner may be used to scan an interframe gap 22, (i.e. the-film between adjacent image frames 26, or the inter-perforation gap 24). Typically, areas between frames of a photographic film that receive little or no light exposure. Therefore, scanning these areas provides a good estimate of the film's $D_{min}$. These methods of determining are well known by those skilled in the art, such as described in U.S. Pat. Nos. 5,081,485 and 5,134,573, referenced above. As an example, the $D_{min}$ for a Kodak 200 speed film for the red, green, and blue channels are 212, 616, and 779, respectively, in units of density* 1000. The $D_{min}$ is determined by using information not contained in any digital representation of the image itself, such as the identification code or the interframe gap scanning as described above.

Referring to FIG. 1, the $D_{min}$ value is propagated 12 through the image processing paths. Such propagation determines the output density or lightness that $D_{min}$ maps to in the metric of the output image. Any time that the $D_{min}$ maps to a density in the metric of the output image which is lighter than black, it is highly unlikely that the output image will contain objects appearing black. In fact, the output image may likely have a "smoky black" appearance. The result of propagating the $D_{min}$ through each image processing path $10_{1-p}$ is a set of P (preferably one for each of the red green and blue image channels) propagated $D_{min}$ values, $D_{min1}'$, to $D_{minP}'$. Propagated $D_{min}$ values are represented by the notation $D_{min}'$. Note that the propagated $D_{min}$ values indicate the mapping of $D_{min}$ through the image processing paths $10_{1-p}$. It should be noted that the image itself may or may not have pixel values at or near the value of $D_{min}$.

Figure 3:
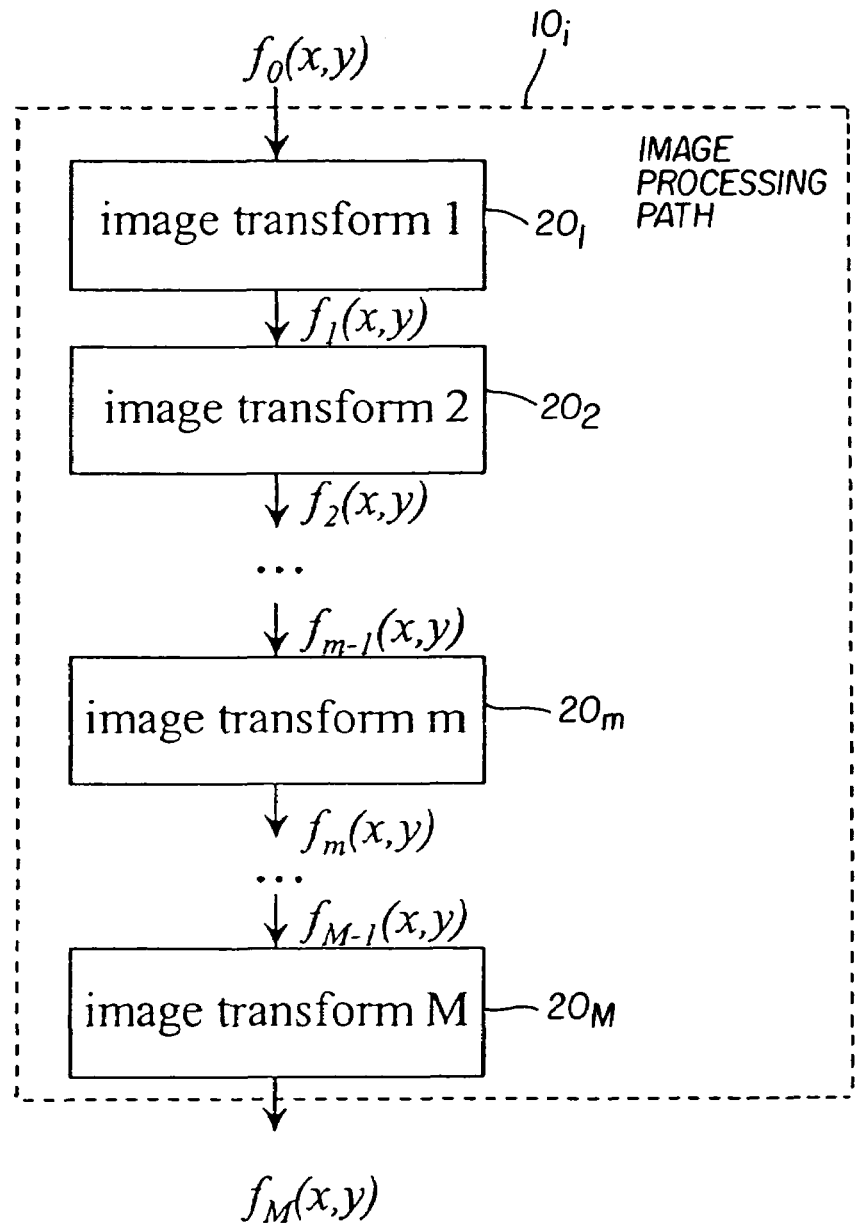
FIG. 3 is a block diagram illustrating an image processing path that is composed of image transforms.

Referring to FIG. 3, each image processing path $10_{1-p}$ includes one or more image transforms $20_{1-M}$ which make up the image processing paths. For example, if image transform $20_1$ is a balance shift performed by adding constants Rs, Gs, and Bs to the red, green, and blue channels of the image, then the value of $D_{min}$ propagated through image transform $20_1$ is found simply by adding Rs, Gs, and Bs to the red, green, and blue components of $D_{min}$. If image transform $20_2$ is a Look-Up-Table (LUT), then the value of $D_{min}$ propagated through the image transform $20_2$ is found by performing a table lookup as is well known in the art, using the current value of the propagated $D_{min}$ as the input to the LUT. The output of the LUT is the propagated $D_{min}$ value through image transform $20_2$. $D_{min}$ is similarly propagated through other image transforms $20_{3-M}$ such as matrices and 3D LUTs as are well known in the art of image processing. Essentially, $D_{min}$ is propagated through any image transform $20_m$ by applying the image transform as if the value of $D_{min}$ was the value of an image pixel.

While these image transforms $20_m$ are typically mathematical operations applied to the pixel values of a digital image, the present invention need not be limited to digital imagery. For example, all of the steps required to expose a photographic negative onto photographic paper can be modeled as a series of image transforms $20_m$. An image transform $20_m$ can represent a physical step that occurs to an image. For example, an image transform $20_m$ could represent the process of printing an image onto photographic paper or an image transform $20_m$ could represent the difference between the calibration aim densities and actual achievable densities.

In addition, image transforms $20_m$ can represent processes preformed by the human visual system when the output image is viewed. Thus, the present invention is useful in selecting an image processing path $10_i$ using black level metric for both digital and analog imaging systems. Those skilled in the art will recognize that the application of an image processing path $10_i$ to an image is implied by the image transform $20_m$. For instance, the image transform steps $20_m$ may represent mathematical operations to apply to the pixel values of a digital image. Or, the image transforms $20_m$ may represent a physical step or the operation of the human visual system. In these cases, the image transform merely represents a process which the image will undergo by viewing the output image, and the image processing path $10_i$ need not apply an image transform $20_m$ representing the response of the human visual system to create an output image ready for viewing.

In a preferred embodiment, certain image transforms $20_m$ have little or no impact on the propagated $D_{min}$ value, and thus may be skipped or omitted when calculating the propagated $D_{min}$ value. For instance, spatial operations such as sharpening or noise reduction generally do not modify the value of $D_{min}$ and may be omitted. Other, more complicated image transforms $20_m$, such as object recognition do not affect the propagated value of $D_{min}$ and may also be ignored. These ignored image transforms are not relevant to the propagated $D_{min}$ value.

By propagating the $D_{min}$ value through each relevant image transform $20_m$ of the image processing path $10_i$, an output propagated $D_{min}$ value is determined. These output propagated $D_{min}$ values relate the density on the output image to the $D_{min}$ associated with the original image.

Again referring to FIG. 1, a black level metric $B_1 \ldots B_i \ldots B_p$ is generated 14 for each image processing path $10_i$. The purpose of generating the black level metric is to summarize the information of the output propagated $D_{min}$ into a single number (the black level metric B) in order to simplify further processing. In the preferred embodiment, a $D_{min}$ value is generated for each channel of the image (e.g. a $D_{min}$ is generated for red, green and blue). The black level metric B is generated by taking the maximum of these Dmin values. For example, if the propagated $D_{min}$ values for red green and blue channels are 879 981 1032 respectively, then the black level metric B is 1032. Those skilled in the art will recognize that the process of generating the black level metric B may be modified without substantially affecting the present method. For example, the black level metric may be generated by taking the mean of the output propagated $D_{min}$ values, in this example 964. The black level metric B is a value that represents the approximate absolute minimum achievable black level for the output image given the image processing path.

Next, an image processing path $10_i$ is selected 16 based on the values of the black level metrics for the respective channels by analyzing the black level metrics $B_1, B_2, \ldots, B_i, \ldots, B_p$ and selecting an image processing path based on the analysis. It is important to notice that the present invention has the capability of selecting an image processing path $10_i$ based on estimates of propagated $D_{min}$ values of the output images without actually examining any image. This allows the method of the present invention to select a preferred image processing path $10_i$ without the need to process an image through each of the alternative image processing paths. In general, the path selection chooses an image processing path $10_i$, where $0 < i \leq p$ having an associated black level metric $B_i$ which meets certain requirements. For example, the selected image processing path $10_i$ may be the path for which the associated black level metric does not exceed a threshold T. The selected image processing path $10_i$ (in part or in whole) is then applied 18 to the image to create a processed output image.

Notice that the present invention determines a propagated $D_{min}$ value using only the original $D_{min}$ value, and an image processing path $10_i$. These inputs contain general information about the imaging system but are non-image data. Non-image data associated with an image is often referred to as image metadata. Thus, the present invention has the capability of selecting an image processing path $10_i$ based solely on metadata analysis. Since no image analysis is required, the calculations required to select an image processing path $10_i$ can be completed very quickly on a typical digital computer.

Figure 4:
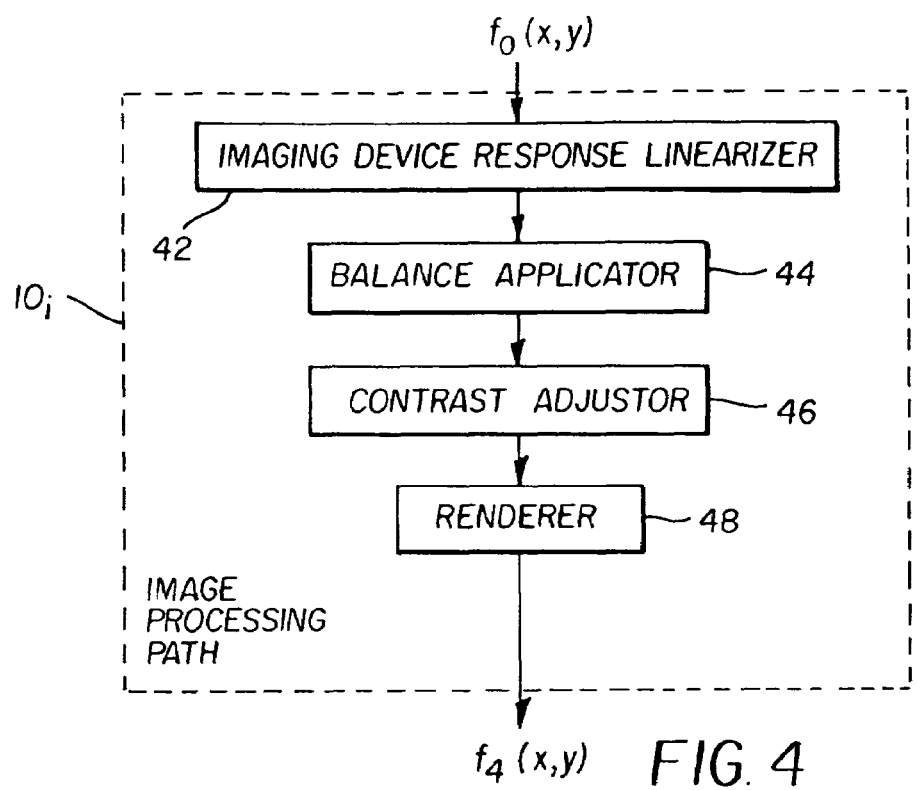
FIG. 4 is a block diagram of an exemplary image processing path.
Figure 5:
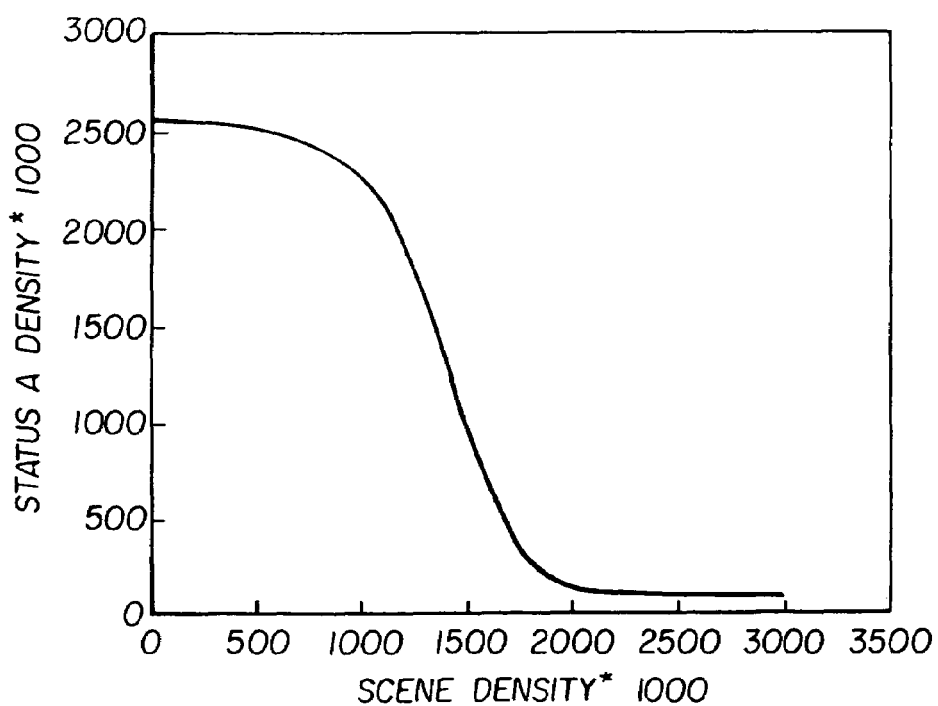
FIG. 5 is a graph representing a rendering LUT.

Referring to FIG. 4, an example image processing path $10_i$ is shown. This exemplary image processing paths $10_i$ composed of image transforms designed to create an output image which is a photographic print from an input image which is a digital scan of a photographic negative. Examples of such image processing paths $10_i$ are disclosed in U.S. Pat. Nos. 6,097,470 and 6,097,471, both issued Aug. 1, 2000 to Buhr et al., which are incorporated herein by reference. The image processing path includes an imaging device response linearizer 42 that applies compensation for non-linearities in the response of the imaging device. A method of correcting for the non-linearities in the response of photographic film may be implemented if the digital image is of film origin. Such a method is described in U.S. Pat. No. 5,134,573 issued Jul. 28, 1992 to Goodwin, which is incorporated herein by reference. The image processing path also includes a balance applicator 44 that applies a scene balance algorithm to the image. Image balancing is often performed by a scene balance algorithm (SBA) or automatic exposure determination algorithm (such as are used in high speed optical printers or in a Photo-CD scanner, see for example U.S. Pat. No. 4,945,406 issued Jul. 31, 1990 to Cok; which is incorporated herein by reference). Also, the image processing path includes a contrast adjustor 46 that determines and applies tonal modifications to the image. The contrast of the image may be estimated by an automatic algorithm. In addition, the contrast of the digital image may be modified to a preferred level of contrast. An example of an algorithm that estimates image contrast and provides a means of adjusting the contrast of the image is described in U.S. Pat. No. 5,822,453, issued Oct. 13, 1998 to Lee et al., which is incorporated herein by reference. Finally, the image processing path $10_i$ also includes a rendering operation 48 such as described in U.S. Pat. No. 6,097,470, referenced above. Rendering either a digital or optical image can with good accuracy be represented by a LUT (either one, three, or multi-dimensional.) For example, FIG. 5 shows the graph of a LUT which relates image densities (scene densities) to densities of the output media of the output image. The metric of the output image is preferably Status A* 100, although those skilled in the art will recognize that many output image metrics may be used as the rendering space (for example, sRGB is common.)

The alternative image processing paths $10_i$ may attempt to reduce the occurrence of the smoky black image condition (by balancing darker or by not lightening shadows in the contrast adjustor 46 LUTs, for example). Those skilled in the art of image processing recognize that image processing paths $10_p$ may be constructed which reduce the occurrence of the smoky black image condition in an output image relative to an output image created by the base image processing path $10_1$. For example, on average, darkening an image by a small amount with the image transform 20 which performs image balancing, reduces the occurrence of the smoky black image condition. In addition, an image transform 20 which performs contrast adjustments such as the contrast adjustor 46 of FIG. 3 can be employed with the present invention. By varying image contrast, the $D_{min}$ may be propagated to lighter or darker densities, as desired. The potential image processing paths $10_p$ shown in FIG. 1 may vary in terms of the image transforms $20_m$ from which the image processing path $10_i$ is composed, the ordering of the image transforms, or the parameters from which the image transforms are created.

The black level metric B represents the approximate absolute minimum achievable black level in the output image given the image processing path. In the preferred embodiment, the output image may have a smoky black appearance if the black level metric is greater than a threshold T. This occurs because the black level metric represents the density resulting from application of the image processing chain to the $D_{min}$ (which is the density resulting on the photographic film in regions of substantially no light exposure). If this black level metric is mapped to a density greater than threshold T, this implies that regions of the film receiving no light exposure will be mapped to densities substantially less than black (i.e. lighter than black). Visually, this is objectionable and has the appearance of a smoky black. Thus, image processing paths resulting in a black level metric B less than threshold T may likely be objectionable in terms of smoky black appearance, while image processing paths $10_i$ resulting in a black level metric B greater than threshold T are likely to not produce a smoky black appearance.

Referring again to FIG. 1, the step of selecting 16 the image processing path that produces the most desirable black level metric will now be explained in greater detail. Let the selection of the image processing path $10_i$ for a given image a be indicated by s(a)=i, indicating that image processing path $10_i$ was selected for image a. In the preferred embodiment, the step of selecting the path may be characterized by a predetermined criteria such as the following set of equations:

If$(B_1 < T_1)$ $s(a) = io$ such that $B_{io} > T_1$ and is the minimum of all $B_i < T_1$. Else $s(a) = 1$ Essentially, the selected path is the base image processing path $10_1$ as long as its associated black level metric is greater than threshold $T_1$. Otherwise, $B_1 < T_1$ and in that case, the selected image processing path $10_i$ is the image processing path $10_i$ which has the lowest value of $B_i$ but is still greater than $T_1$. If none of the image processing paths $10_{1-p}$ have black level metric greater than $T_1$, then the selected image processing path $10_i$ is the image processing path $10_i$ which has the maximum black level metric.

Note that a potential time savings for this system is to compute the black level metrics and alternative image processing paths $10_2, \ldots, 10_i, \ldots, 10_p$ only when necessary, i.e. only when $B_1 < T_1$.

Those skilled in the art of image processing will recognize that several of the image transforms described above rely on the image content to set the operational parameters of the image transform. To save processing time and complexity, this is usually accomplished by examining a low resolution version of the image. The black level metric would be determined by processing according to the image transforms adjusted for the actual image. The selected image processing path $10_i$ can vary on an image by image basis. In other words, the preferred image processing path $10_i$ for a first image may be different than the preferred image processing path $10_i$ for a second image, even in the case when the images originate from the same image capture device and are printed by the same printing device onto the same media.

It is possible to optimize the threshold $T_1$ to achieve the maximum image quality over a population of images. This can be accomplished by first selecting a set of A images (preferably $A \geq 50$) then creating output images for each of the A images according to each of the P image processing paths $10_i$. Next, human observers may assign preferences to each of the output images. These preferences can be considered to be quality data. Let $Q_{ap}$ represent the quality rating placed on the $a^{th}$ image produced with the $i^{th}$ image processing path $10_i$. The goal of the step of selecting 16 an image processing path is for each image a, to select the image processing path $i_o$ which resulted in the highest quality rating $Q_{apo}$ for the $a^{th}$ image. The overall average quality $A_Q$ of the population may be calculated as:

$$A_Q = \frac{1}{A} \sum_{a=1}^{A} Q_{as(a)}$$

Thus, $T_1$ may then be varied until the overall average quality $A_Q$ is maximized. The value of $T_1$ is determined by maximizing the value of $A_Q$ by optimization techniques well known in the art. By this method, the value of $T_1$ was determined to be 200 in units of 100 * Status A density.

Those skilled in the art will also recognize that the equations guiding the step of selecting 16 an image processing path $10_i$ may be accomplished in a variety of ways. For example, the following rules may alternatively be used in order to select the image processing path $10_i$.

If $(B_1 > T_1)$ $s(a) = 1$

Else $s(a) = io$ such that $B_{io}$ is the maximum of all $B_i$

Figure 6:
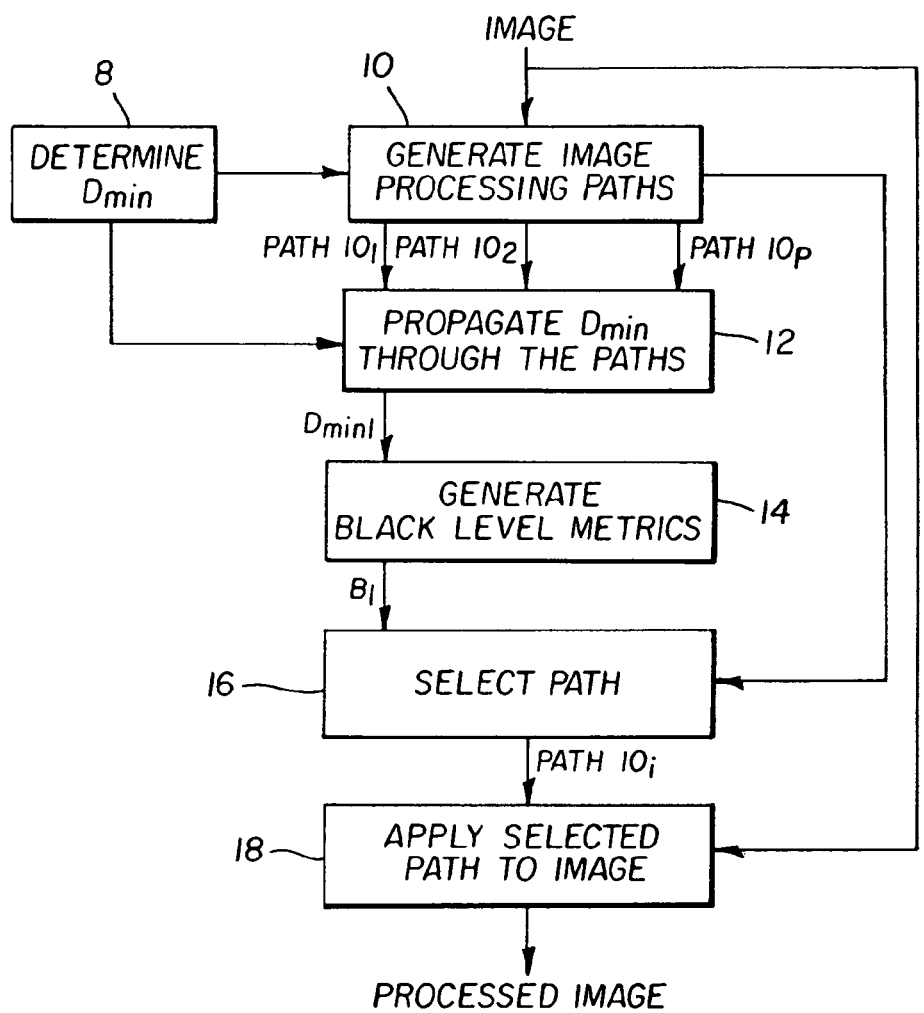
FIG. 6 is a schematic block diagram illustrating an alternative embodiment of the present invention.

An alternative embodiment of the invention is shown in FIG. 6. In this embodiment, the black level metric B. from the base image processing path $10_1$ is used to select 16 the selected image processing path 10.

The operation of this alternative selection 16 may be represented by an equation:

If $(B_1 > T_1)$ $s(a)=1$

Else if $(B_1 > T_2)$ $s(a)=2$

Else if $(B_1 > T_3)$ $s(a)=3$

This alternative embodiment performs best when the steps taken to reduce the objectionability of the smoky black effect of the output image increase in magnitude as the path number increases. Note also that $T_1 > T_2 > T_3$.

Figure 7:
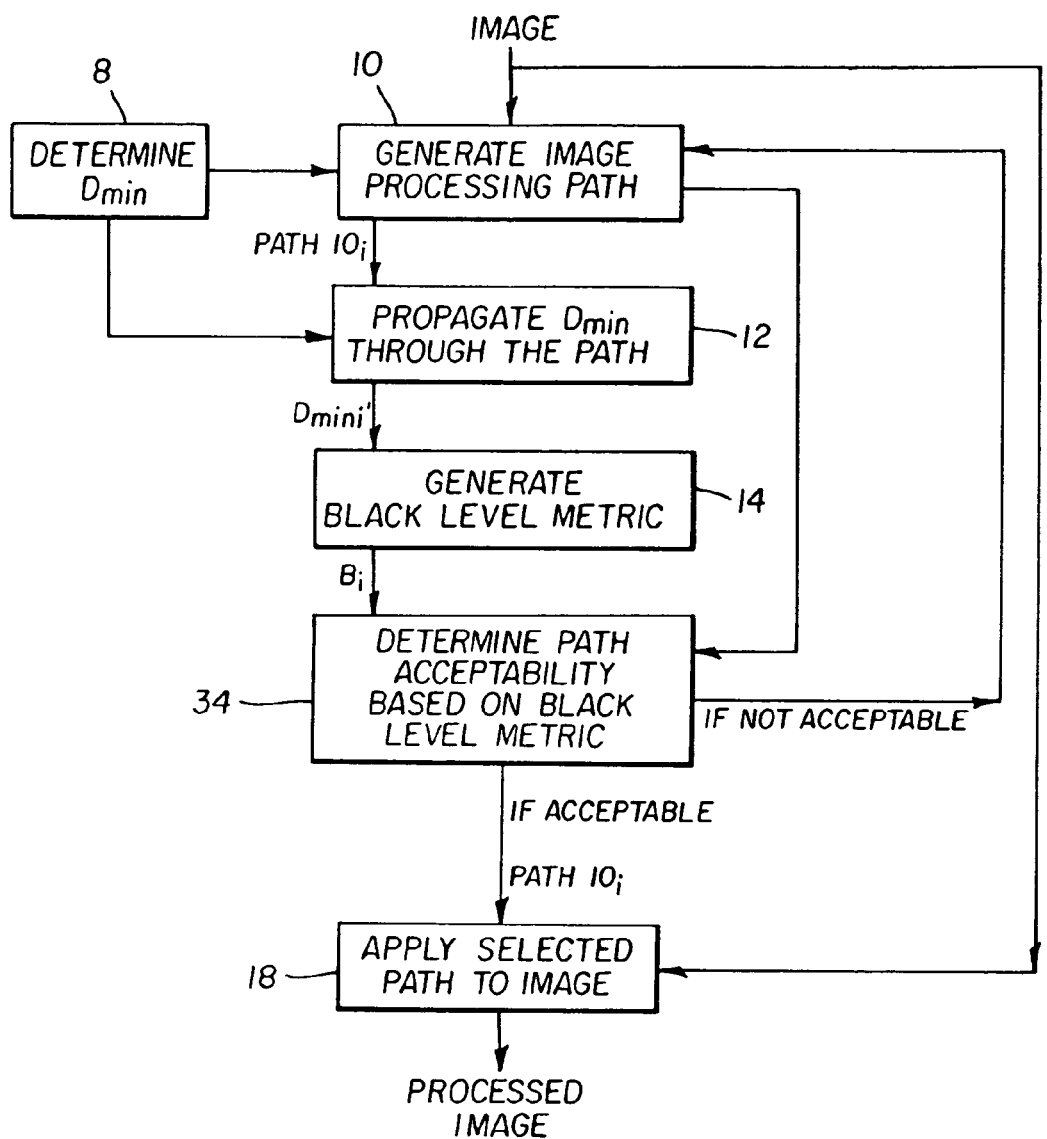
FIG. 7 is a schematic block diagram illustrating a farther alternative embodiment of the present invention.

FIG. 7 shows a further alternative embodiment where the step of selecting an image processing path as shown in FIG. 1 is replaced by the step of determining 34 the acceptability of an image processing path, based on the propagated black level metric. This embodiment describes a method by which iteration is used to arrive at the selected image processing path $10_i$. As previously described, a black level metric $B_1$ is computed by determining 8 $D_{min}$, generating 10 an image processing path, propagating 12 the $D_{min}$ through the path, then generating 14 a black level metric B from the propagated $D_{min}$. Next, the acceptability of the image processing path is determined 34 based on the black level metric. If the black level metric is greater than threshold $T_1$, then the output image produced by the processing path is acceptable and the base image processing path $10_1$ is selected as the selected image processing path $10_i$. Otherwise, a second image processing path $10_2$ is generated 10 by either modifying an existing image transform $20_m$ or adding or removing existing image transforms $20_m$. The image processing path $10_2$ is then used to propagate 12 $D_{min}$ and then to generate 14 a black level metric, as before. This acceptability of this second black level metric is then determined 34. This process repeats until the black level metric meets predetermined criteria and an image processing path $10_i$ is selected, or until some other stopping condition is met. The acceptability of an image processing path is determined 34 based on a set of equations:

If $(B_i > T_1)$ image processing path is accepted as selected image processing path $10_x$ Else image processing path is not accepted.

Each time an image processing path $10_i$ is generated 10 additional or higher magnitude steps are taken to reduce the smoky black appearance on the output image by darkening the reproduction of $D_{min}$ in the output image. For example, as previously stated, the exposure correction applied by the balance applicator 44 in FIG. 4 may be iteratively decreased (in steps of 0.1 stops, for example) by adjusting an adjustable parameter to generate 10 each image processing path $10_i$. Thus, each subsequent image processing path $10_i$ would produce a darker (and likely less objectionable appearing) output image. Preferably, the exposure correction applied by the balance applicator 44 is decreased by the difference between the black level metric and the threshold $T_1$.

In addition, the contrast adjustor 46 of FIG. 4 applies a dynamic range compression to the image. While this operation generally results in an improved output image, occasionally the lightening of low density regions results in an image appearing to have smoky blacks. The degree of dynamic range compression is controlled by the slope of the LUT created by the contrast adjustor 46. Each subsequently generated 10 image processing path $10_i$ can increase the limit on the allowable minimum slope of the LUT created by the contrast adjustor 46 beginning with the limit used by the base image processing path (preferably 0.3) in small increments (preferably 0.05) up to a limit (preferably 1.0, which essentially prevents the contrast adjustor 46 from having an effect.) Increasing the limit on the allowable minimum slope (the adjustable parameter) allows less dynamic range compression which ensures darker shadows with less visible noise.

The change in slope limit may be imposed only on the low intensities of the image, for example. Thus, it must be recognized when generating 10 subsequent image processing paths that there exists a trade-off between noise appearance and the deviation from the base image processing path $10_1$.

Alternatively, the LUT produced by the contrast adjustor 46 may be forced to map a specific input density (the propagated $D_{min}$ value at that point in the image processing path) to a desired output density (for example, $T_1$). Techniques for mapping specific input values of a LUT to specific output values are well known in the art.

The present invention has been described with reference to a preferred embodiment. Changes may be made to the preferred embodiment without deviating from the scope of the present invention. For example, in the preferred embodiment, an image processing path $10_i$ is selected based solely on black level metrics of one or more image processing paths $10_{1-p}$. However, those skilled in the art will recognize that the selection 16 of an image processing path may operate on any number of computed image metrics in addition to the black level metric. For example, the maximum local contrast such as described in U.S. Pat. No. 5,363,209, issued Nov. 8, 1994 to Eschbach et al., which is incorporated herein by reference, may be simultaneously considered, along with the black level metric. Such modifications to the preferred embodiment do not significantly deviate from the scope of the present invention.

| PARTS LIST | |
|---|---|
| 8 | determine $D_{min}$ |
| 10 | generate image processing path |
| 12 | propagate $D_{min}$ through the path |
| 14 | generate black level metric |
| 16 | select path that produces most desirable black level metric |
| 18 | apply selected path to image |
| $10_i$ | image processing path i |
| 22 | interframe gap |
| 24 | inter-perforation gap |
| 26 | image frame |
| $20_m$ | image transform m |
| 34 | determine acceptability of path based on black level metric |
| 42 | imaging device response linearizer |
| 44 | balance applicator |
| 46 | contrast adjustor |
| 48 | renderer |

What is claimed is:

1. A method for processing a photographic image captured by an image capture system, comprising the steps of:
   a) determining a maximum dark value for the image capture system representing the response of the system to no light exposure;
   b) generating an image processing path for processing the image prior to display on an output device, the image processing path having one or more image dependent image transforms, that upon processing the maximum dark value produces a processed maximum dark value that meets a predetermined criteria for darkness such that the "smokey black" problem is minimized; and c) applying the image processing path to the photographic image to produce a processed photographic image;

wherein the step of generating an image processing path includes the steps of:

b1 providing plurality of different processing paths;

b2 propagating the maximum dark value through the different processing paths; and b3 choosing the processing path that produces the most desirable processed maximum dark value.

2. The method claimed in claim 1, wherein the photographic image is a photographic negative film image, the maximum dark value is Dmin, and the step of determining the maximum dark value of the image capture system comprises scanning an interframe gap between frames on the film.

3. The method claimed in claim 1, wherein the photographic image is a photographic negative film image, the maximum dark value is Dmin, and the step of determining the maximum dark value of the image capture system comprises using an identification code associated with the film that points to a Dmin value stored in a data base.

4. The method claimed in claim 1 wherein said image has a plurality of color channels and said propagating the maximum dark value through the different processing paths further comprises determining a maximum dark value component as to each of said channels and setting the highest of said maximum dark value components as the maximum dark value of the respective said image processing path.

5. The method claimed in claim 1, wherein the step of generating said image processing paths includes the steps of:

providing a base image processing path; and modifying one or more image transforms of the base image processing path based on the propagated maximum dark value to produce the other image processing paths.

6. A method for processing a photographic image captured by an image capture system, comprising the steps of:

determining a maximum dark value for the image capture system representing the response of the system to no light exposure;

generating a plurality of black level metrics using said maximum dark value, each said black level metric being associated with a respective one of a plurality of different image processing paths;

selecting one of said plurality of different image processing paths based on said black level metrics, to provide a selected image processing path, said selected image processing path having one or more image dependent transforms, said selected image processing path having a respective said black level metric that meets a predetermined criteria; and applying the image processing path to the photographic image to produce a processed photographic image.

7. The method of claim 6 wherein said determining step is based on metadata associated with said image.

8. The method of claim 6 wherein said generating further comprises:

subsampling said image to provide a low resolution copy; and propagating said copy along each of said image processing paths.

9. The method of claim 6 wherein said generating further comprises:

providing said plurality of different image processing paths;

propagating the maximum dark value through the different processing paths; and choosing the processing path that produces the most desirable processed maximum dark value.

10. The method claimed in claim 9 wherein said image has a plurality of color channels and said propagating the maximum dark value through the different processing paths further comprises determining a maximum dark value component as to each of said channels and setting the highest of said maximum dark value components as the maximum dark value of the respective said image processing path.

11. The system of claim 6 wherein said means for generating and means for selecting further comprise:

means for providing a base image processing path;

means for propagating the maximum dark value through the base image processing path; and means for modifying one or more image transforms of the base image processing path based on the propagated maximum dark value to produce the other image processing paths.

12. The method of claim 6 wherein said generating and selecting further comprise:

providing a base image processing path;

propagating the maximum dark value through the base image processing path; and modifying one or more image transforms of the base image processing path based on the propagated maximum dark value to produce the other image processing paths.

13. A method for processing a photographic image captured by an image capture system, comprising the steps of:

determining a maximum dark value for the image capture system representing the response of the system to no light exposure using metadata associated with said image;

generating a plurality of black level metrics using said metadata, each said black level metric being associated with a respective one of a plurality of different image processing paths;

selecting one of a plurality of different image processing paths to provide a selected image processing path, said selected image processing path having one or more image dependent transforms, said selected image processing path having a respective said black level metric that meets a predetermined criteria; and applying the image processing path to the photographic image to produce a processed photographic image.

14. The method of claim 13 wherein said generating is independent of content of said image.

15. The method of claim 13 wherein said generating further comprises:

subsampling said image to provide a low resolution copy; and propagating said copy along each of said image processing paths.

16. The method of claim 13 wherein said determining step is based on metadata associated with said image.

17. The method of claim 13 wherein said generating further comprises:

providing said plurality of different image processing paths;

propagating the maximum dark value through the different processing paths; and choosing the processing path that produces the most desirable processed maximum dark value.

18. The method claimed in claim 13 wherein said image has a plurality of color channels and said propagating the maximum dark value through the different processing paths further comprises determining a maximum dark value component as to each of said channels and setting the highest of said maximum dark value components as the maximum dark value of the respective said image processing path.

19. The method of claim 13 wherein said generating and selecting further comprise:
   providing a base image processing path;
   propagating the maximum dark value through the base image processing path; and
   modifying one or more image transforms of the base image processing path based on the propagated maximum dark value to produce the other image processing paths.

20. A system for processing a photographic image captured by an image capture system, comprising the steps of:
   means for determining a maximum dark value for the image capture system representing the response of the system to no light exposure;
   means for generating a plurality of black level metrics using said maximum dark value, each said black level metric being associated with a respective one of a plurality of different image processing paths;
   means for selecting one of a plurality of different image processing paths based on said black level metrics, to provide a selected image processing path, said selected image processing path having one or more image dependent transforms, that upon processing the maximum dark value produces a processed maximum dark value that meets a predetermined criteria for darkness such that the "smoky dark" problem is minimized; and
   means for applying the image processing path to the photographic image to produce a processed photographic image.

* * * * *